Patented Nov. 18, 1952

2,618,652

UNITED STATES PATENT OFFICE 2,618,652

PROCESS FOR THE PURIFICATION OF ACRYLATE AND METHACRYLATE ESTERS

William C. Hollyday, Jr., Fanwood, N. J., assignor to Standard Oil Development Company, a corporation of Delaware No Drawing. Application April 21, 1950, Serial No. 157,397

6 Claims. (Cl. 260—486)

This invention relates to a process for the purification of ester monomers. Particularly this invention relates to a process for the purification of unsaturated ester monomers. More particularly, the invention relates to a process for the purification of unsaturated ester monomers prepared by ester interchange between unsaturated acid esters of low molecular weight alcohols and high molecular weight alcohols.

In recent years need for esters of unsaturated acids has increased markedly. Of particular importance have become the esters of the alpha-beta unsaturated acids such as acrylic acid, methacrylic acid, crotonic acid, fumaric acid, maleic acid, and the like. Both the high and low molecular weight esters of these acids, as well as polymers thereof, have found wide-spread use as raw materials for the preparation of various industrial products such as plastics, plasticizers, resins, varnish oils, drying oils, lubricant additives, and so forth.

In the preparation of these acid esters the direct esterification of the acid may be utilized in some instances. However, in the preparation of high molecular weight esters, that is, the esters of these unsaturated acids wherein the ester group contains from about 5 to 30 carbon atoms, it has been found advantageous to prepare the high molecular weight esters by a process of ester interchange. This interchange is carried out in accordance with the following equation:

(I) 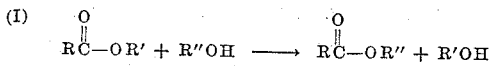

wherein R, R' and R" are alkyl groups, R" having a greater number of carbon atoms than R'. The equilibrium, being a reversible one, is ordinarily shifted to the right and the yield of the right hand products increased by removing the resultant alcohol by distillation and the employment of a suitable catalyst. Exemplary of the catalysts suitable for this ester interchange are p-toluene sulfonic acid, benzene sulfonic acid, sulfosalicylic acid, and sulfuric acid, the former being preferred.

The unsaturated esters employed in this ester interchange are ordinarily easily polymerized during heating and to prevent excess polymerization, inhibitors such as hydroquinone, phenyl beta-naphthylamine, para-tert. butyl catechol, are employed, hydroquinone having outstanding utility in this respect.

In the preparation of high molecular weight acrylate and methacrylate esters by the ester interchange reaction methyl acrylate or methyl methacrylates are ordinarily used in conjunction with the desired high molecular weight alcohol. It has heretofore been a common procedure to separate the desired ester monomer, that is, the high molecular weight monomer, from the mixture of reaction products by a distillation step. This distillation step, however, is undesirable for the following reasons:

1. During the distillation step there is always some monomer polymerization and a consequent loss of product;

2. In the distillation of the desired monomer from a mixture of alcohols there is some fractionation of the ester monomers so that the resulting distillation product is relatively richer in the lower molecular weight monomers; and 3. The distillation step would involve technical difficulties when performed on a plant scale because of the high temperature and high vacuums needed to remove the high molecular weight monomers.

It has now been found that this distillation step may be eliminated and thus the objectionable features mentioned above overcome in ester interchange reactions involving acrylates and methacrylates by a process of product purification using ammonia to precipitate undesirable reaction impurities enabling the purification process to be completed by ordinary washing procedures.

Attempts to purify the reaction products of an ester interchange reaction involving acrylate and/or methacrylate esters have been unsuccessful because of the emulsion difficulties. These emulsion difficulties are caused by the presence of polymers of the low molecular weight acrylate or methacrylate esters. When using methyl methacrylate as a starting material the products of the ester interchange reaction would include small amounts of methyl methacrylate polymer. When this crude reaction product is washed with water there results an emulsion which sets into a stiff gel. This gel does not break when allowed to stand for several weeks and cannot be broken successfully by any means used ordinarily to break emulsions.

In the process of this invention the low molecular weight methacrylate polymer present in the ester interchange reaction products is removed by precipitation and filtration. The remaining mixture of products may be further purified by water washing and alkaline washing steps.

In the process of this invention the mixture of products obtained in the ester interchange reaction is treated with ammonia, the precipitate resulting therefrom removed by filtration and the filtrate, containing the desired unsaturated ester monomer, is further purified by washing with water and with an alkaline solution. Although in the preferred embodiment of the invention a stream of gaseous anhydrous ammonia is bubbled through the ester interchange reaction products, it is also within the concept of this invention to use several separate washing steps with aqueous ammonia.

Although the exact mechanism of the precipitation of the methyl methacrylate polymer is not known, it may be postulated that the polymer is coprecipitated along with the ammonium salt of the p-toluene sulfonic acid or other sulfonic acid type catalyst used as the esterification or the ester interchange reaction catalyst.

In general, the process of this invention is as follows: About one mol of a high molecular weight alcohol is heated with about 2½ times as much methyl methacrylate using p-toluene sulfonic acid as the catalyst and hydroquinone as a polymerization inhibitor in a distilling flask. Methyl alcohol is distilled from the reaction mixture along with the excess of methyl methacrylate. The crude product contains not only the desired monomer but other materials as listed in Table I below. Together with these other materials, constituting undesirable constituents of the mixture, are listed the means for removing them in accordance with the instant invention.

TABLE I

| Impurity | Removal Process |
|---|---|
| 1. p-Toluene sulfonic acid | Precipitated as ammonium salt. |
| 2. Methyl methacrylate polymer | Coprecipitated with ammonium salt of p-toluene sulfonic acid. |
| 3. Hydroquinone | Water and alkaline washing. |
| 4. Methyl methacrylate monomer | Trace, water washing. |
| 5. Methyl alcohol | Trace, water washing. |
| 6. High molecular weight alcohol | Trace, not harmful. |
| 7. High molecular weight methacrylate polymer | Trace, not harmful. |

In the instance of using an amine type inhibitor, such as phenyl beta naphthylamine, it is desirable to use an acidic solution prior to the washing step, instead of the alkaline solution listed above.

Along with the sulfonic acid and methyl methacrylate polymer most of the darkly colored materials are also precipitated or decolorized by the ammonia treatment. The treated ester is yellow to almost water white in color while the untreated reaction product is dark red to black.

The invention will be further described by reference to the following specific examples:

*Example I*

A product prepared by the ester interchange reaction between 11.87 mols of a $C_{10}$ alcohol prepared by subjecting an olefinic $C_9$ fraction obtained by polymerizing a mixture of propylene and butenes to the action of carbon monoxide and hydrogen in the Oxo process (U. S. Patent No. 2,327,066) and 30 mols of methyl methacrylate using 85 grams of p-toluene sulfonic acid as the catalyst and 85 grams of hydroquinone as a polymerization inhibitor was vacuum stripped to a bottoms temperature of 120° C. (4.5 mm. of mercury) to remove excess methyl methacrylate. The crude product (2911 grams) was purified as follows:

A portion of the crude, dark red ester interchange reaction product (100 ml., 89.8 g.) was treated with a stream of anhydrous ammonia at room temperature. A precipitate started to form at once and after several minutes the color had disappeared entirely from the product. The white voluminous precipitate which formed was filtered off. The filtrate was a pale straw colored oil. After washing successively with water and 2% sodium hydroxide there was recovered 90 ml. (79.2 g.) of $C_{10}$ Oxo methacrylate, equivalent to a total yield of 2565 g. or 95.7% of the theoretical yield.

*Example II*

A product prepared by the ester interchange reaction between 5.0 mols of a commercial mixture of alcohols known as Lorol B alcohol, prepared by hydrogenating coconut oil and having an average number of carbon atoms of 13.5 (containing 3% decyl alcohol, 46% dodecyl alcohol, 24% tetradecyl alcohol, 10% cetyl alcohol, and 17% octadecyl alcohol) and 12.5 mols of methyl methacrylate using 40 g. of p-toluene sulfonic acid as a catalyst and 40 g. of hydroquinone as a polymerization inhibitor was vacuum stripped to remove excess methyl methacrylate. The crude product was purified as follows:

A portion of the crude dark red reaction product was treated with 6% by volume of water vigorously agitated and allowed to settle. The precipitate was filtered off and the filtrate treated with a stream of ammonia gas. Only a small amount of ammonia was required to decolorize the oil. The precipitate formed was filtered off. After an additional treatment with 5% by volume of water and the resulting precipitate filtered off, the filtrate was then washed several times with an equal volume of 2% sodium hydroxide and water. The final product recovered was equivalent to 1063 grams or 78.3% of the theoretical yield.

*Example III*

A product prepared by the ester interchange reaction between 7.58 mols of a $C_8$ alcohol prepared by subjecting the $C_7$ fraction of a product obtained by polymerizing a mixture of butylenes and propylene to the action of carbon monoxide and hydrogen in the Oxo process (U. S. Patent No. 2,327,066) and 19.00 mols of methyl methacrylate using 50 g. of p-toluene sulfonic acid as a catalyst and 50 g. of hydroquinone as a polymerization inhibitor was vacuum stripped to remove excess methyl methacrylate. The crude product was purified by several washings with 10% by volume of aqueous ammonia and further washing with 2% sodium hydroxide and water. The upper oil layer was decanted from the gelatinous precipitate after each aqueous ammonia treatment. There was recovered an 82% yield of the desired $C_8$ methacrylate monomer.

Polymerizability of the methacrylate monomers prepared in accordance with the above examples was demonstrated by treating a mixture of 40% by weight of the methacrylate ester and 60% of a white oil having a viscosity of 42 Saybolt Universal seconds at 210° F., a viscosity index of 82, a flash point of 370° F. and a pour point of −25° F., with 1% benzoyl peroxide, based upon the weight of the methacrylate ester. After a reaction time of about 24 hours at 70° C., the polymer concentrates obtained were used to prepare 3.6% by weight blends in a mineral base lubricating oil blend having a viscosity at 210° F. of 46 S. U. S.

and a viscosity index of 112, referred to as oil A. Data are given in Table II below:

TABLE II

| Monomer | 3.6 Wt. Percent Blends in Base Oil A | | |
|---|---|---|---|
| | Vis./100°F. S.U.S. | Vis./210°F. S.U.S. | V.I. |
| None | | 46.0 | 112 |
| Ex. 1.—C₁₀ Oxo Methacrylate | 450.9 | 84.4 | 144.3 |
| Ex. 3.—C₈ Oxo Methacrylate | 364.1 | 76.1 | 148.6 |
| Ex. 2 and 3.—20% Lorol B Methacrylate 80% C₈ Oxo Methacrylate Copolymer | 460.2 | 90.6 | 147.0 |

It will be seen by an examination of the data in Table II above that the methacrylate ester monomers prepared in accordance with the process of this invention may be polymerized into polymers having very satisfactory viscosity index improving potency.

To summarize briefly, this invention relates to a process for the purification of acrylate and/or methacrylate esters of high molecular weight alcohols prepared using a sulfonic acid type esterification catalyst which comprises precipitating the low molecular weight methacrylate polymer from the crude mixture of products by the use of ammonia. This precipitation and filtration may be followed by successive washing with water, and if desired, a polar solution.

What is claimed is:

1. A process for the purification of an unsaturated ester monomer selected from the class consisting of acrylate and methacrylate esters of saturated aliphatic alcohols prepared by an ester interchange reaction utilizing p-toluene sulfonic acid as a catalyst which comprises passing a stream of anhydrous ammonia through the crude ester interchange product, filtering off the resulting precipitate, washing the filtrate successively with water and an alkaline solution, and recovering a substantially pure unsaturated ester monomer.

2. A process according to claim 1 wherein said unsaturated ester monomer is an acrylate ester.

3. A process according to claim 1 wherein said unsaturated ester monomer is a methacrylate ester.

4. A process according to claim 1 wherein said ester is an acrylate ester of an alcohol containing from 8 to 20 carbon atoms and said alkaline solution is 2% sodium hydroxide.

5. A process according to claim 1 wherein said ester is a methacrylate ester of a commercial mixture of alcohols having an average number of carbon atoms of 13.5 obtained by the hydrogenation of coconut oil, and said alkaline solution is 10% sodium hydroxide.

6. A process according to claim 1 wherein said ester is a methacrylate ester of an alcohol obtained by subjecting a C₇ fraction of a product obtained by polymerizing a mixture of butylenes and propylenes to the action of carbon monoxide and hydrogen in the Oxo process.

WILLIAM C. HOLLYDAY, JR.

REFERENCES CITED

The following references are of record in the file of this patent:

UNITED STATES PATENTS

| Number | Name | Date |
|---|---|---|
| 2,129,662 | Barret et al. | Sept. 13, 1938 |
| 2,129,665 | Barret et al. | Sept. 13, 1938 |
| 2,129,666 | Barret et al. | Sept. 13, 1938 |